United States Patent Office 3,522,645
Patented Aug. 4, 1970

3,522,645
AUTOMATIC INSERT ASSEMBLING MACHINE
Thomas C. Kennicott, Janesville, Wis., assignor to Giddings & Lewis, Inc., Fond du Lac, Wis., a corporation of Wisconsin
Filed Mar. 8, 1968, Ser. No. 711,643
Int. Cl. B23p 19/04; B23q 7/10
U.S. Cl. 29—208                                          9 Claims

ABSTRACT OF THE DISCLOSURE

An assembly machine is described for automatically locating and fixing inserted parts in corresponding openings in a workpiece receptacle. The assembly mechanism includes individual means for stripping an insert from a feeding device and positioning it within the receptacle, for seating the insert in position, for inserting an index key into the next receptacle opening, for indexing the receptacle to bring the next opening into position, and for withdrawing the index key preparatory to positioning the next insert.

---

The present invention relates to automatic assembly machines. In its principal aspect, it is directed to an automatic machine for assembling individual blade elements into corresponding openings spaced evenly within an automotive torque converter impeller housing.

Torque converter assemblies as used in motor vehicle automatic transmissions commonly include a split toroidal housing or shell in which each half contains a plurality of individual spaced vanes or blades. The housings are made with individual recessess or openings to receive the blades, which are then prevented from falling out by either a friction fit or a snap-in locking action in which the blade is retained until a further manufacturing operation permanently secures the blades to the housing. Generally, such blades are disposed radially relative to the central axis of the impeller housing, but this is not necessarily true in all cases. An assembly machine for such housings must therefore be adaptable for use with various blade position layouts which differ from the simple radial arrangement.

In view of the foregoing, it is a principal object of the present invention to provide an automatic assembly machine of improved construction for placing individual inserts in corresponding receptacle openings in a workpiece. This is to be achieved through combining a series of individual mechanical operations into an integrated sequence which successively takes an empty workpiece shell from a loading position, transfers it to an assembly position, locates a first insert opening, positions and seats an insert therein, indexes the workpiece in stepwise fashion while filling the remaining insert openings, and transfers the assembled workpiece to an unload position.

In greater detail, it is intended by the present invention to provide specific mechanism whereby each of the individual process elements of the assembly operation can be separately controlled. These elements comprise the acts of inserting an indexing key into an opening in the workpiece, indexing the workpiece to an assembly position, removing the key, stripping an insert from a feeding means and placing it into position within the workpiece, and seating the insert by a "kicking" operation which either frictionally secures the insert or snaps it into place to insure that it cannot fall out during subsequent handling operations.

The mechanism contemplated for carrying out the foregoing objectives is intended to be relatively simple, reliable, and easily adjusted, with shared elements of the mechanism being used in place of separate individual rotating and reciprocating parts. In particular, it is intended that the indexing operation be performed with an index key carried by a slidable index carriage which is rotatable about its sliding shaft for furnishing the required inserting or "dive" motion, and that the kicker mechanism be pivoted on the same shaft.

Another object is to drive all the mechanical assembling elements of the machine by means of a plurality of cams on a single common camshaft. The individual cam linkages or mechanisms are intended to be individually adjustable over their normal ranges of operational adjustment without the requirement of repositioning the operating cams. A single power transmission means is then usable for driving the combined mechanism through the common camshaft.

Other objects and advantages of the invention will become apparent from considering the following detailed description and upon reference to the drawings, in which.

While the invention is described in connection with particular exemplary embodiments and procedures, it will be understood that it is not intended to so limit the invention, but it is instead intended to cover all alternative and equivalent constructions, methods and procedures as may be included within the spirit and scope of the invention as defined by the claims.

GENERAL MACHINE ORGANIZATION AND OPERATION

Figure 1:
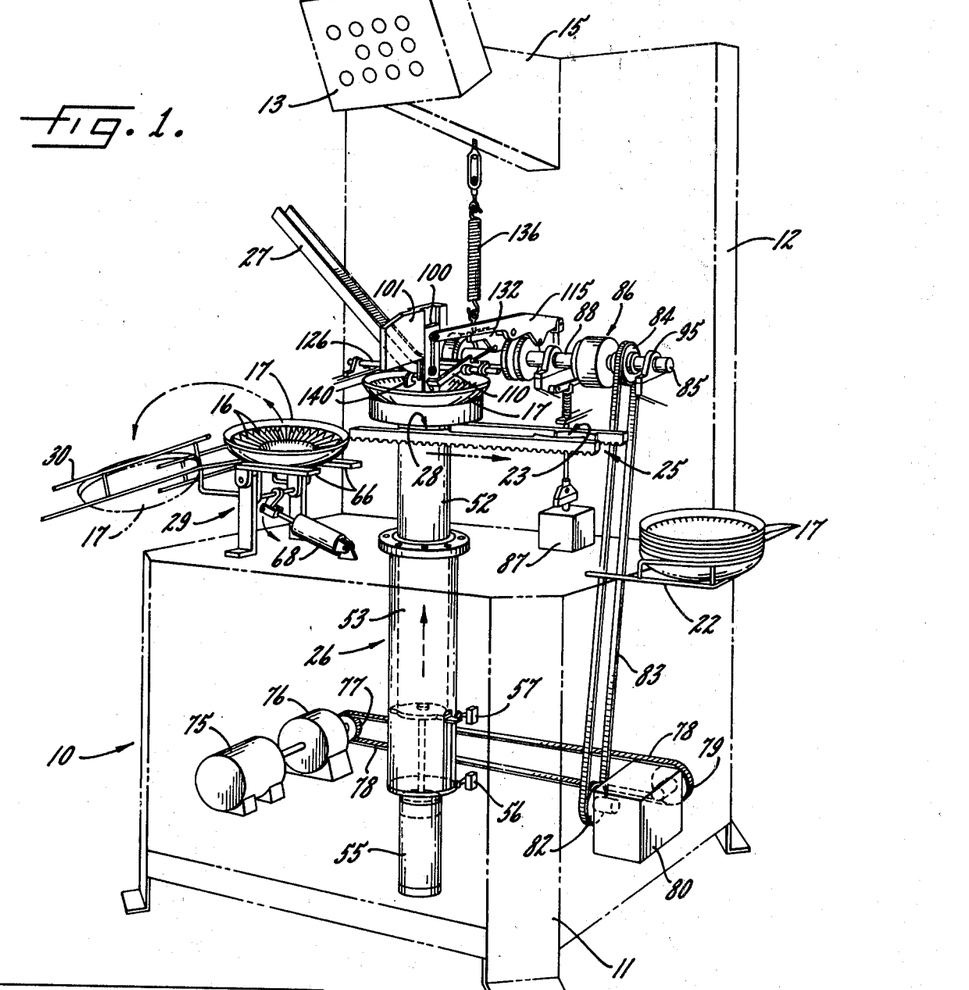
FIG. 1 is a perspective view showing certain of the principal operating elements of an assembly machine exemplifying the present invention, with the surface outline of the machine being shown in phantom.
Figure 2:
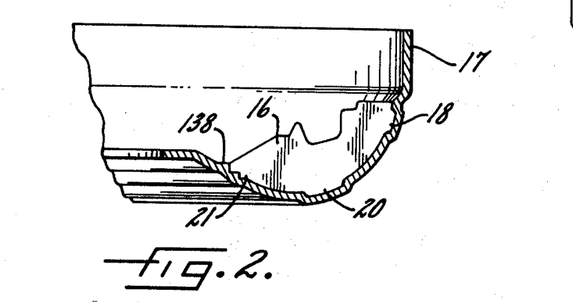
FIG. 2 is a typical fragmentary section through an impeller housing of the type which the assembly machine is adapted to assemble, showing an impeller blade which has been assembled into place.

Turning first to FIG. 1, the principal operating elements of a machine embodying the present invention are shown within the dotted outline of a machine frame 10. The frame 10 consists essentially of a base portion 11 and an upright portion 12, to which a control panel 13 is attached by a cantilever support 15.

The machine of the present embodiment is intended to assemble individual inserts 16 into predetermined positions in a toroidal receptacle 17. For purposes of the present example, the receptacle 17 is an automobile torque converter impeller housing or drum, and the inserts 16 are turbine blades. The blades 16 are provided with locating means including projections 18, 20 and 21 which engage corresponding notches provided in the drum 17. In the completed assembly, the blades 16 are arranged in a fan-like pattern or track around the inside of the toroidal drum 17.

Figure 3:
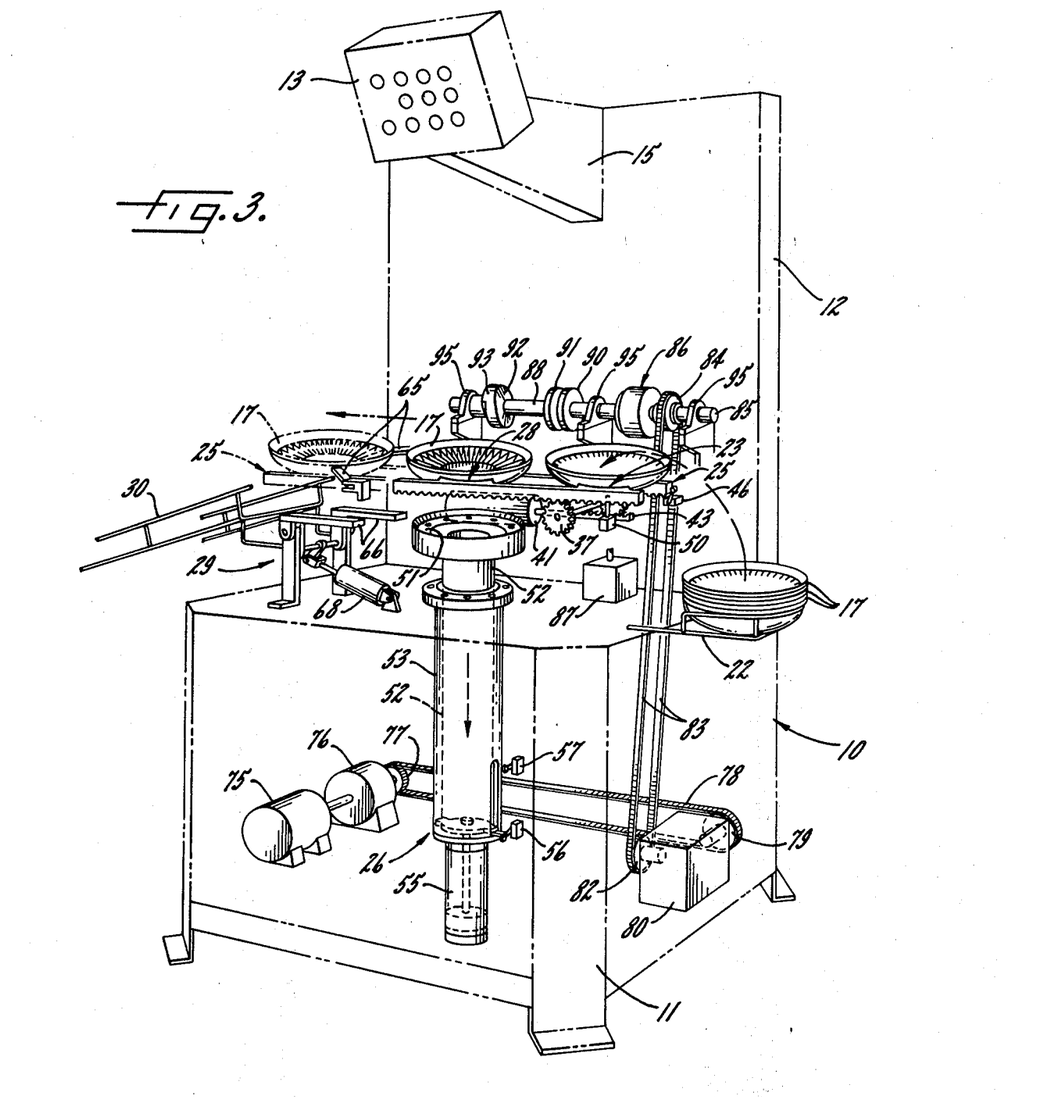
FIG. 3 is a perspective view similar to FIG. 1, but here illustrating other portions of the operating mechanism.

The drums 17 are moved through the machine from right to left, as seen in FIGS. 1 and 3. A stack of empty drums is seen in the ready position at the right of the machine, resting in a wire rack or basket 22. From the basket 22 the individual drums are placed by hand into a loading position within a concave holder or loading pot 23 at one end of a transfer shuttle 25 (FIG. 3). The carriage 25 is then translated to the left as seen in the figures and carries the empty drum 17 to a ready position centered immediately over an elevator means 26. The elevator means 26 carries the empty drum 17 upward to an assembly position (FIG. 1) wherein the individual inserts are assembled from a magazine feeding means 27 by mechanism which is described further herein.

The inserts 16 are commonly fixed by the assembly machine into their respective openings in the drum 17 with only a snap-in or friction fit, thus requiring further manufacting operations to finally secure them in place. Such operations may include welding as in the illustrative example wherein the projections 18, 20, 21 do not protrude through the shell of the receptacle drum 17, or by peening or bending if the projections are sufficiently long to extend through and beyond their punched-out openings in the drum.

With the assembly operation at the assembly station finished and the transfer shuttle 25 returned to its right-hand position, the elevator means 26 lowers the completed drum assembly into an unloading pot 28 located on the left-hand side of the shuttle. The shuttle 25 then shifts again to the left, carrying the next empty drum to the ready position and carrying the assembled drum to a dump station wherein power-operated unloading means 29 tips the completed assembly out of the unloading pot 28 into another wire basket 30. From the latter position the assembled drum is removed by hand for subsequent operations.

THE DRUM TRANSFER MECHANISM

Figure 4:
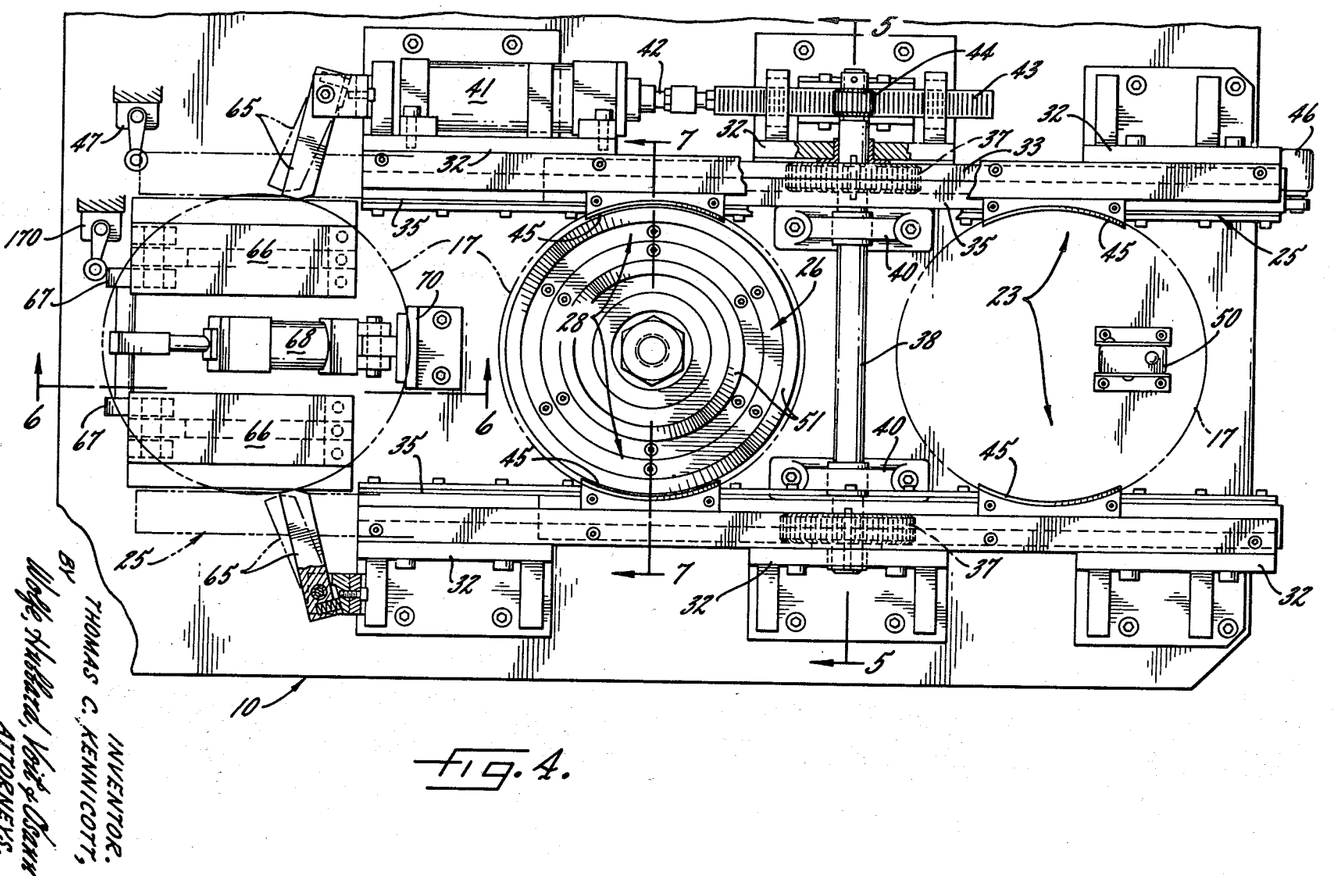
FIG. 4 is a partial plan view of the impeller housing transfer carriage mechanism of the assembly machine.
Figure 5:
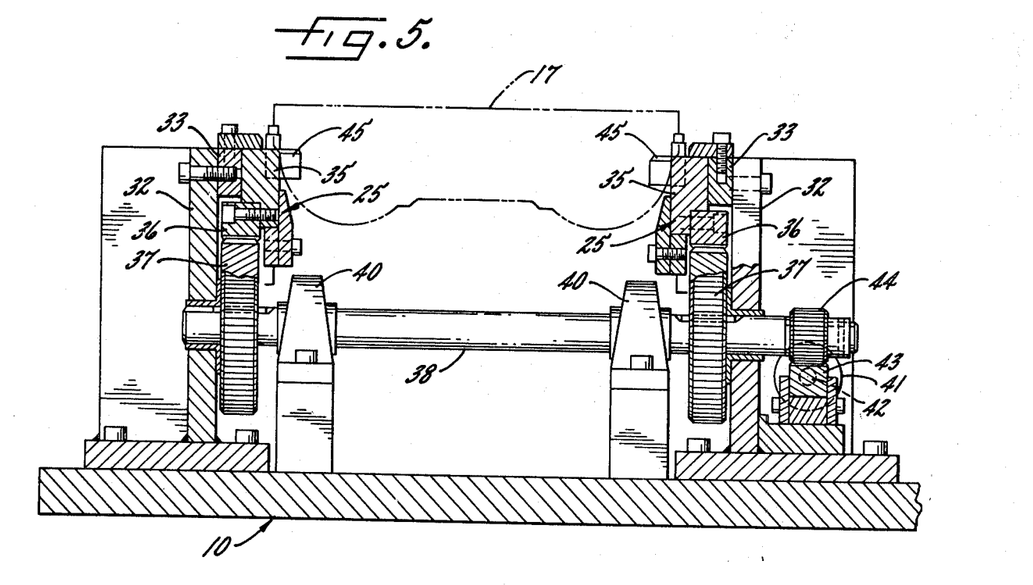
FIG. 5 is a section taken substantially along the line 5—5 of FIG. 4.

From the wire loading basket 22, each empty drum 17 is placed by hand into the loading pot 23 on the translatable transfer carriage 25. The carriage is best shown in FIGS. 4 and 5, wherein the principal operating mechanism of this portion of the apparatus is detailed. Side members 32 are carried by the frame 10 to form parallel tracks 33 on which the carriage 25 may translate back and forth.

The carriage 25 itself consists of two unconnected side pieces 35 each having a rack 36 on its lower surface. The side pieces 35 are shifted in unison by a pair of pinion gears 37 mounted to a common shaft 38 which is rotatably carried by the frame 10 of the machine by journal blocks 40. Each gear 37 is keyed to the shaft 38.

The carriage 25 is powered by a hydraulic cylinder 41 located adjacent one of the side pieces 32 and aligned parallel to the direction of carriage movement. The hydraulic cylinder 41 has an operating rod 42 ending in a rack 43. The rack 43 engages a pinion gear 44 which is keyed to the main shaft 38 of the carriage operating mechanism. Actuation of the hydraulic cylinder 41 causes longitudinal movement of the rack 43, which imparts rotational movement to the shaft 38 through the gear 44. This movement is then transferred to the carriage 25 through the gears 37 and the respective racks 36 of the carriage frame pieces 35.

The individual pots 23, 28 which are adapted to receive and hold the drum 17 are formed by cradle inserts 45. The curved inner surfaces of the inserts 45 support the rounded drum 17 within the carriage 25.

The elevator means 26 is located directly beneath the ready position. The carriage 25 is movable over a path of travel which enables either of the pots 23, 28 to be selectively positioned directly over the elevator means 26. When in the right-hand position, the unloading pot 28 is positioned over the elevator, and when in the left-hand position the loading pot 23 is so positioned. Control for these motions is achieved through the use of a limit switch 46 at the right-hand end of carriage travel, and a similar limit switch 47 at the left-hand end. A third switch 50 is provided immediately beneath the loading position so that an empty drum 17 when placed in the loading pot 23 activates the switch 50 and initiates the assembly sequence.

When the carriage 25 has carried an empty drum 17 to the ready position immediately above the elevator means 26, the elevator raises the empty drum out of the loading pot 23 and elevates it to the assembly station wherein the actual assembly operations are carried out. While assembly is proceeding the shuttle returns to the right, bringing the pot 28 into position ready to receive the assembled drum when the elevator means 26 again lowers.

Figures 7, 8:
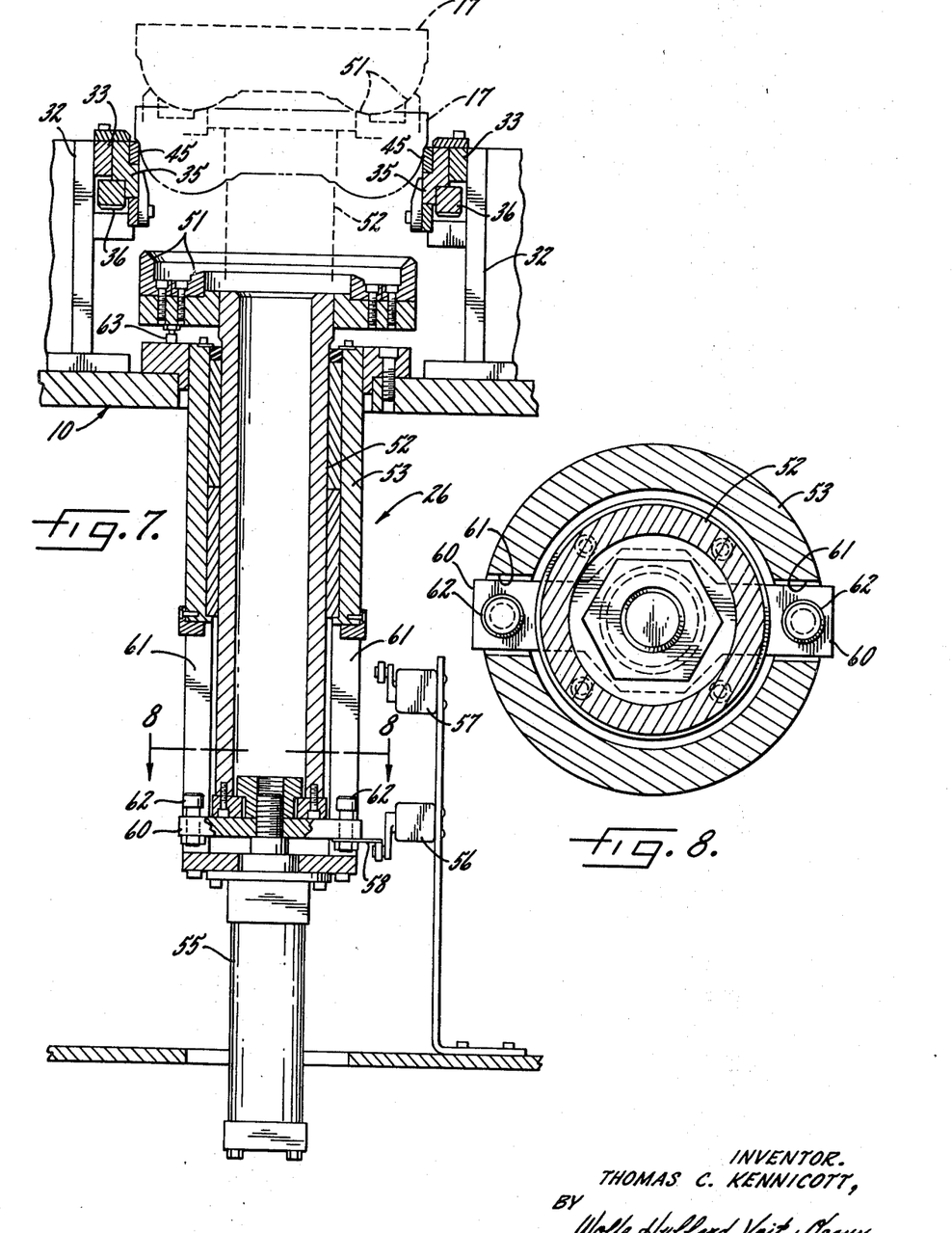
FIG. 7 is a section taken substantially along the line 7—7 of FIG. 4.
FIG. 8 is a section taken substantially along the line 8—8 of FIG. 7.

The elevator means 26, as best illustrated in FIGS. 7 and 8 includes a hollow toroidal receptacle or nest 51 adapted to receive and positively locate each drum 17 during assembly. The nest 51 is supported on a cylindrical column 52 which is slidable within a housing 53 carried by the frame 10 of the machine. At the base of the shaft 52 is an elevator hydraulic cylinder 55 which is effective to raise and lower the shaft 52 and nest 51 between limits determined by limit switches 56, 57. The limit switches 56, 57 are operated by a small tang 58 extending from a transverse key member 60 which rides in vertical slots 61 within the housing 53 to locate the shaft 52 and nest 51 against rotation. The exact upper limits of elevator travel are determined by stop screws 62 on the key 60. The lower limit is determined by a small stop screw 63 at the base of the nest 51.

After assembly, each drum assembly is lowered from the assembly position into the unloading pot 28 and the carriage 25 is translated to the left to bring the assembled drum to the unload position as shown in phantom in FIG. 4. In moving the final few inches into position, the completed drum 17 rides over spring-loaded dogs 65 which positively prevent it from being carried back on the return stroke of the carriage 25.

Figure 6:
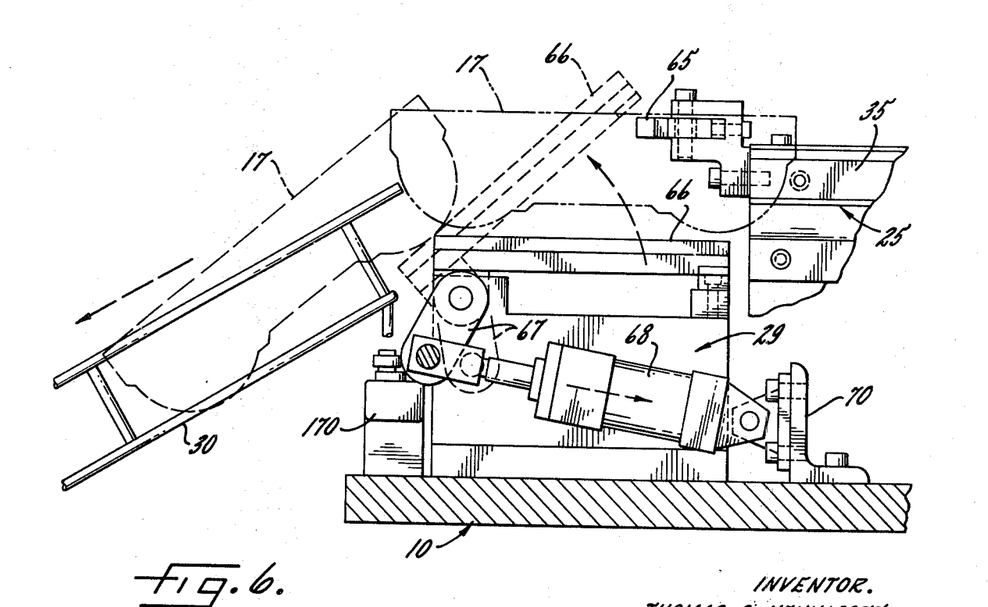
FIG. 6 is a section taken substantially along the line 6—6 of FIG. 4.

When the carriage 25 has returned to the right-hand position, a dump means 29 (FIG. 6) is actuated to eject the completed drum assembly into the basket 30. For this purpose a hinged platform 66 is provided which is connected by an operating lever 67 to a dump air cylinder 68. The cylinder is pivoted at its base on an attachment bracket 70 secured to the frame 10 of the machine. Upon being energized, the cylinder 68 draws the operating lever 67 toward the attachment bracket 70, thus tipping the hinged platform 66 upward to eject the drum from the unloading pot 28 and causing it to slide into the downwardly tilted basket 30. From this point the completed drum assembly is manually removed and transferred to the next stage of the manufacturing operation.

THE INSERT ASSEMBLY MECHANISM

As shown in FIGS. 1 and 3, a constant speed motor 75 is located within the base of the machine. The motor 75 is connected through a manually operated brake 76 to a drive pulley 77 and a drive belt 78. The drive belt 78 is in turn connected through a pulley 79 to a speed reducer unit 80. From the speed reducer 80, a drive sprocket 82 transfers power through a roller drive chain 83 to another sprocket 84 co-axial with and keyed to an output shaft 85. During operation, the motor 75 runs continuously, thus imparting continuous motion to the entire drive train up to and including the drive sprocket 84 on the drive shaft 85. However, motion is not transferred to the operating mechanism except upon the selective operation of a single-revolution clutch 86 connecting the drive shaft 85 to a camshaft 88. Such single-revolution clutches are well known, and in the illustrative embodiment a Type 6 single-revolution clutch manufactured by the Hilliard Corporation of Elmira, N.Y., is used. The operating characteristics of such a clutch allow the drive shaft 85 to rotate continuously until actuation of the solenoid 87 causes one or more revolutions of the camshaft 88 until the solenoid is released, whereupon the clutch 86 again disengages.

Figure 9:
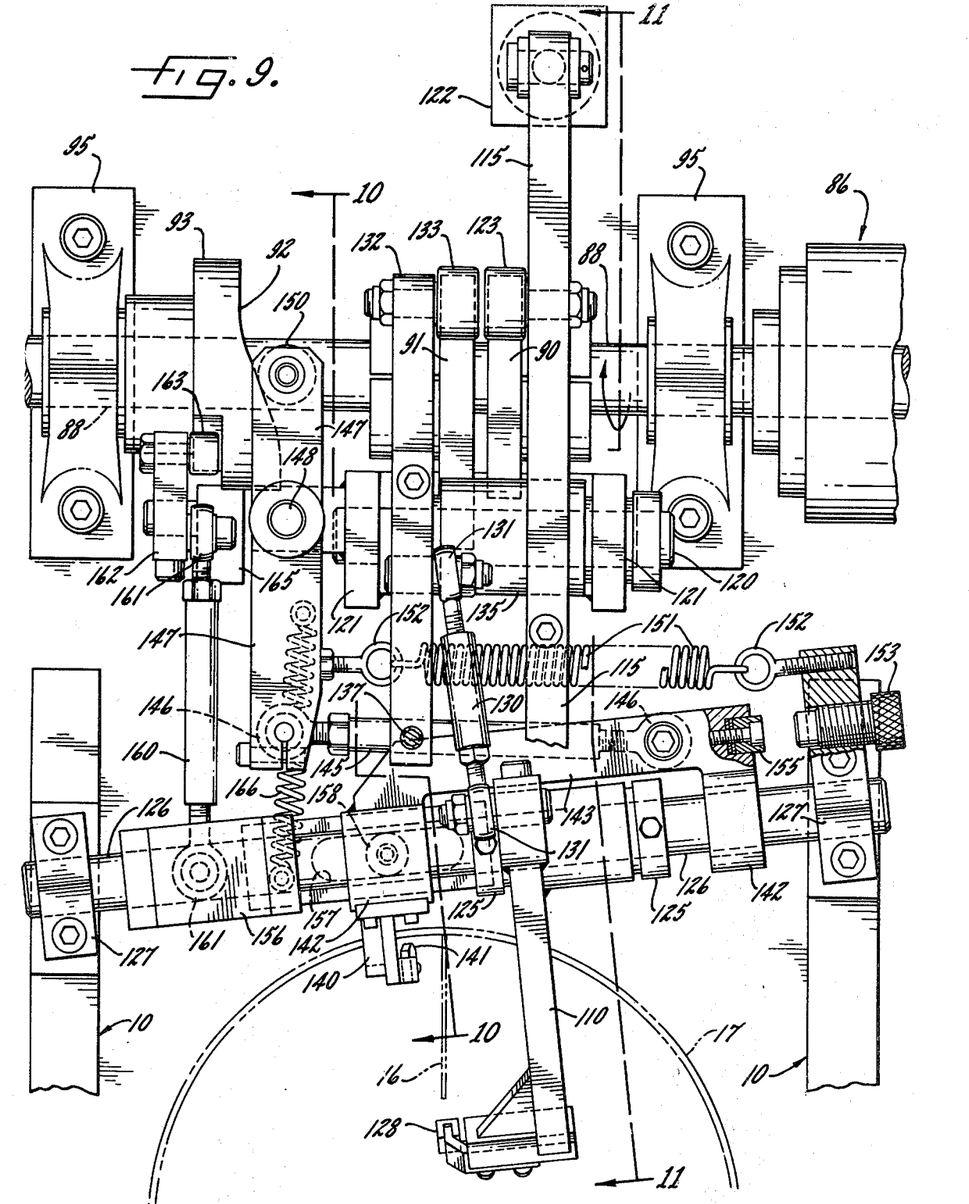
FIG. 9 is a partial plan view of illustrative indexing and insert assembling mechanisms of the assembly machine shown in FIG. 1.

Referring particularly to FIG. 9, the single-revolution clutch 86 is connected to the camshaft 88 on which the individual operating cams are carried. The individual cams comprise a stripper cam 90, a kicker cam 91, an index search cam 92, and an index nod cam 93. The individual operating motion controlled by each of the foregoing cams will be subsequently described in detail. The camshaft 88 on which the respective cams 90, 91, 92 93 are carried is itself journaled in journal blocks 95 secured to the frame 10 of the machine slightly above and behind the insert assembly station.

As a principal feature of the invention, four individual and separately controllable assembly operations are performed during the insertion of each blade 16 into its corresponding opening within the receptacle drum 17. It is a further feature of the invention that this is accomplished through the use of mechanism including four individual operating cams carried by a single camshaft and driven from a common power source. The significance of the individual operating motions can best be appreciated by consideration of the following description in connection with the cam cycle chart shown in FIG. 15. As can be seen from this chart, the complete operating cycle for assembling a single blade insert 16 into its respective opening in the receptacle drum 17 is accomplished during a single revolution of the camshaft 88 as initiated by release of the clutch 86 on command from the solenoid 87.

At the beginning of the insert cycle, it may be assumed for purposes of explanation that a drum 17 supported in the assembly position by the elevator means 26 has been previously indexed to the correct position for the insertion of the next blade 16 into its corresponding opening. In other words, one opening in the track of insert openings around the circumference of the drum 17 is correctly oriented with respect to the insertion mechanism. In the first operation, a blade 16 is stripped from the magaine 27 and inserted into position. As a second operation, a loading step is performed which forceably presses or kicks the blade 16 home into final position. As a third separate operation, the mechanism indexes the drum 17 by one blade position to align the next empty opening in position for assembly. As a fourth separate operation, the index mechanism is caused to nod or move in and out of indexing engagement to clear or stand back from the next blade opening to prevent interference with the next insertion operation.

The general organization of the blade assembly mechanism is shown in the plan view of FIG. 9. The single-revolution clutch 86 drives the four individual motion-controlling cams through the camshaft 88. From right to left in FIG. 9, the cams comprise the stripper cam 90, the kicker cam 91, the index search cam 92 and the index nod cam 93.

Figure 11:
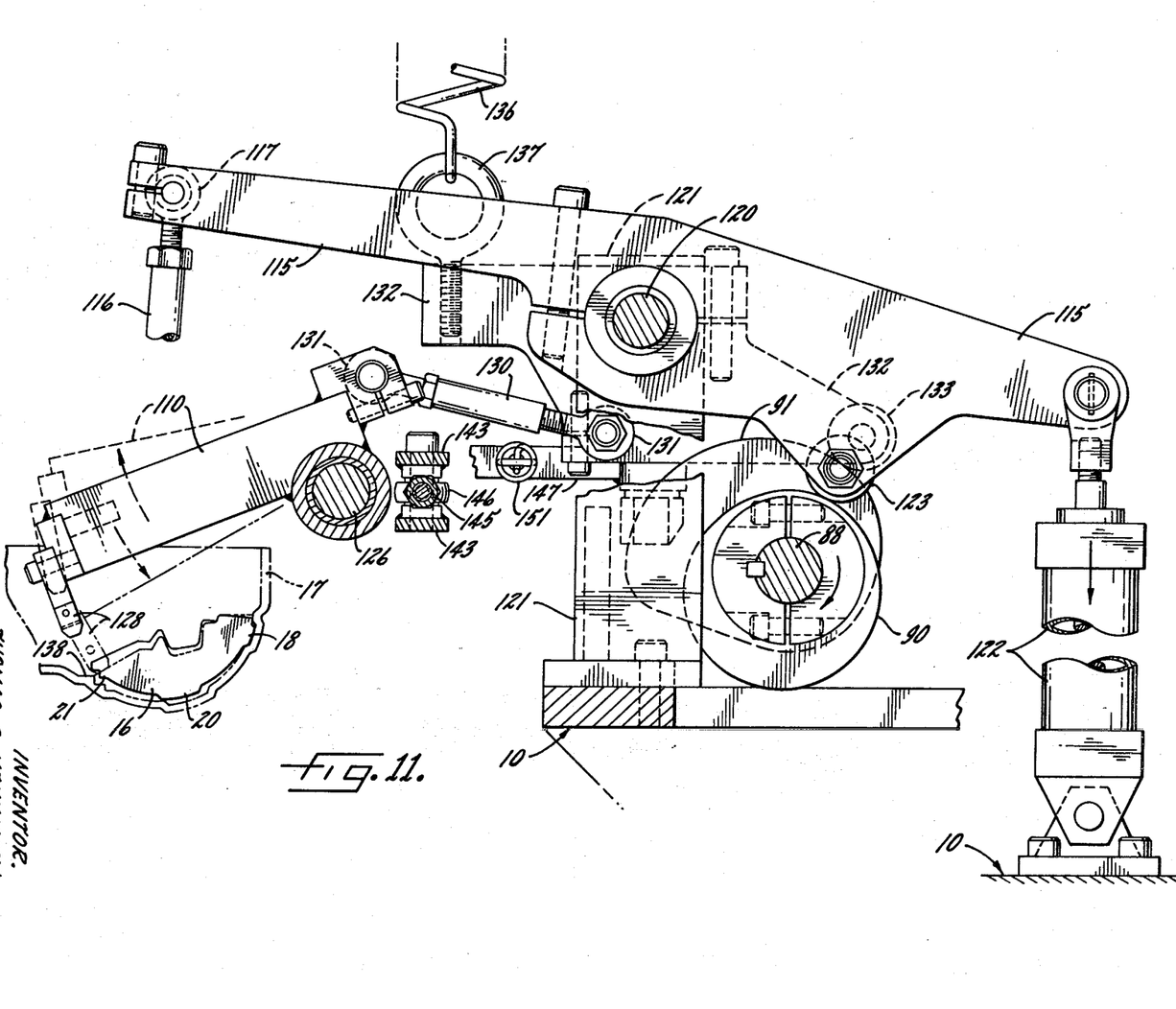
FIG. 11 is a section taken substantially along the line 11—11 of FIG. 9.
Figure 12:
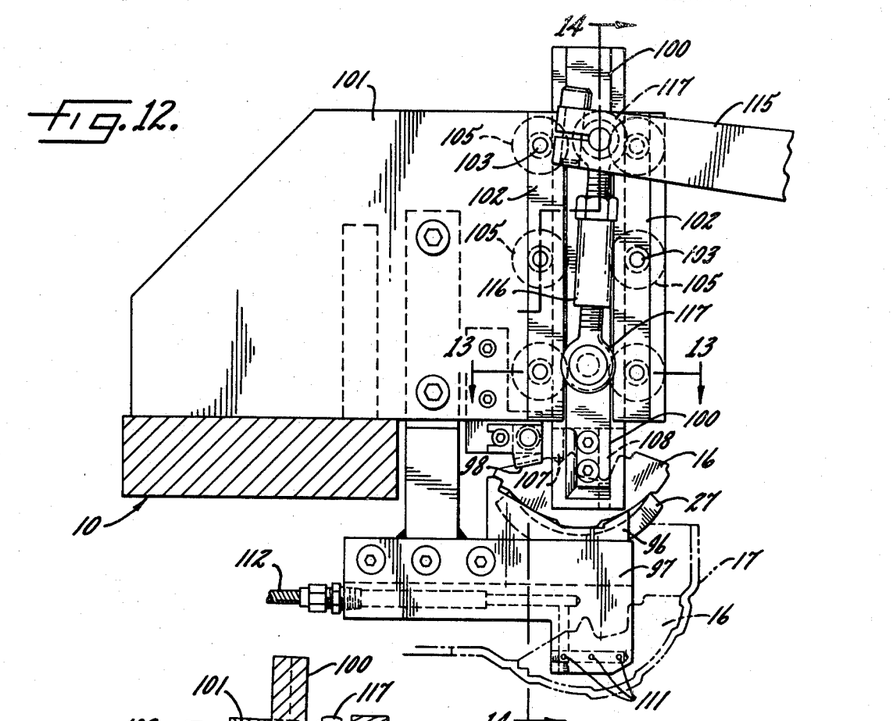
FIG. 12 is a partial side elevation of the insert stripping mechanism of the assembly machine.
Figure 13:
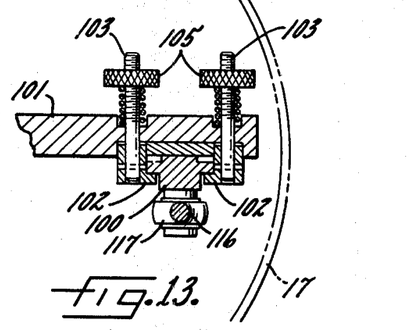
FIG. 13 is a section taken substantially along the line 13—13 of FIG. 12.
Figure 14:
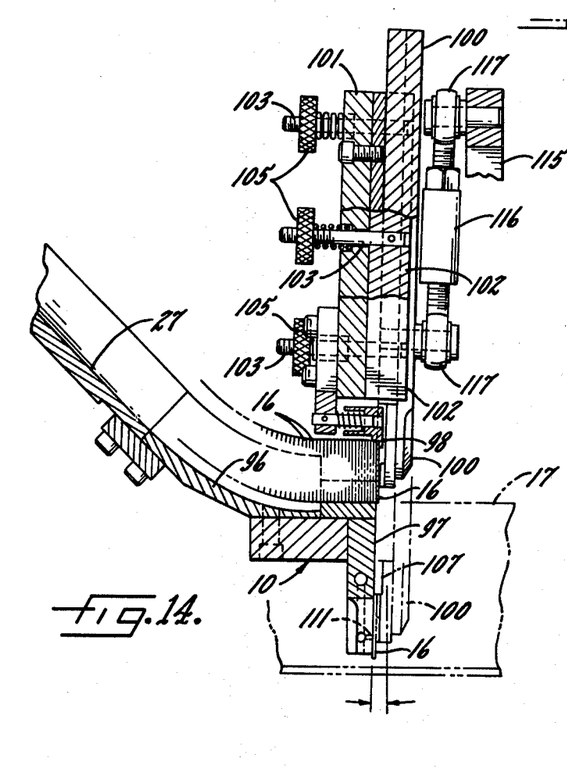
FIG. 14 is a section taken substantially along the line 14—14 of FIG. 12.

The stripper cam 90 drives a stripper mechanism which is shown in FIGS. 11, 12, 13 and 14. The function of this apparatus is to serve as a means of stripping individual blades from the magaine 27 and inserting them into position within the drum 17. The magaine 27 is inclined so that the weight of a stack of blades 16 urges the blades into the feeding mechanism. The magazine 27 ends in a curved portion 96 which terminates in a guide plate 97 having a spring-loaded stop 98 against which each blade 16 rests before being stripped off for insertion. As shown in FIGS. 12 and 14, the guide plate 97 is shaped to fit within the cross-sectional outline of the track in which the blades 16 are to be placed, and it is also canted at an angle which corresponds to the angle of the blade openings in the drum 17. The guiding surface of the guide plate 97 is thus aligned relative to the indexed position of each blade opening so that a blade 16 held in face-to-face contact with the guide surface is guided directly into registry with its opening.

Each blade 16 is stripped from the magazine 27 by a stripper 100 which is guided for up-and-down movement in a support 101, which is in turn secured to the frame 10. A track for the stripper is formed by gibs 102 retained to the support 101 by adjustable spring-loaded pins 103. The undersurface of the gibs 102 forms a track in which the stripper 100 slides. By turning knurled adjusting nuts 105 the degree of tension of the pins 103 may be adjusted, and thus the force tending to pull the gibs 102 against the backplate 101 may be adjusted. At its lower end, the stripper is provided with abutments 107, 108 which engage corresponding notches in the blade 16 and prevent it from rotating as the stripper 100 carries the blade downward.

After the stripper 100 has engaged a blade 16 presented from the magazine 27, it carries it downward while maintaining a pressure force against the guide plate 97 through the spring-loaded pins 103. At the end of its travel, as shown in phantom in FIG. 14, the blade 16 is loaded into position adjacent its respective opening in the drum 17. It remains there until a loading arm or kicker 110 forcibly fixes the blade 16 into final position while the stripper 100 returns upward to engage the next blade.

Within the guide plate 97 are three air orifices 111 fed through internal passages by an air line 112. Constant air pressure is supplied to the jets 111 so that a blade 16 which has not been correctly seated will be blown away from the assembling operation so that it cannot jam subsequent assembly steps or otherwise interfere with machine operation. If a blade has been incorrectly seated it will be tipped away from the stripper and another blade is later seated in its place by hand.

The stripper 100 is operated by a stripper lever 115 connected to the stripper slide 100 by an adjustable link 116 having ball joints 117 at each end to allow free articulation. The stripper lever 115 is journaled on a pivot bar 120 carried on mounting brackets 121 secured to the frame 10.

As a further feature of an invention, the air cylinder 122 serves as a yieldable resilient means for linking the stripper slide 100 to the cam movement. A roller cam follower 123 is carried by the stripper lever 115 and urged into engagement with the stripper cam 90 by the force of the air cylinder 122. The air cylinder 122 is mounted to the frame 10 and pivoted to the stripper lever 155. During operation, the air cylinder 122 is energized so as to cause a downward force on the stripper lever as seen in FIG. 11, thus tending to draw the stripper slide 100 upward in its track. It may thus be seen that the stripper cam 90 causes the stripper slide 100 to reciprocate in an up-and-down direction with the air cylinder 122 serving to draw the cam follower 123 into engagement with the cam 90. If the stripper slide 100 should become jammed in a manner which prevented it from drawing away from the inserted blade 16 and picking up a new blade from the magazine 27, the cam follower 123 will simply ride over the base circle of the cam 90 without touching. In this way any jam that might occur within the blade track inside the drum 17 is prevented from becoming complicated by the addition of further blades because a new blade 16 cannot be picked up from the magazine 27 until the trouble is cleared.

While the stripper slide 100 holds the inserted blade 16 into its opening in the drum 17, a loading arm or kicker 110 is effective to forcibly fix the blade into position.

As may best be seen in FIGS. 9 and 11, the loading arm 110 is pivoted between collars 125 on a slide bar 126 carried by support brackets 127 which are in turn secured to the frame 10. At its outermost end, the loading arm carries a kicker head 128 having a broad blunt surface adapted to engage one edge of the blade 16 and drive it home into position in the drum 17. The loading arm 110 is operated through an adjustable link 130 having ball joints 131 at each end and connected to a loading lever 132 having a roller cam follower 133 at its opposite end. The loading lever 132 is pivoted on the same pivot bar 120 as the stripper lever 115, with the two pivoted members 115, 132 being separated by a spacer 135.

As another aspect of the invention, the interconnecting linkage between the kicker cam 91 and the loading arm 110 is also provided with a yieldable connection whereby excessive stresses are avoided in the event of any jam which prevents the loader arm from moving through its complete reciprocating cycle. For this purpose a spring 136 is connected between the cantilever 15 of the frame 10 and an eyebolt 137 carried at one end of the loading lever 132. The spring 136 serves as the only force urging the loading lever cam follower 133 against the kicker cam 91 during normal operation. Should a jam occur underneath the loading arm 110 or kicker head 128, the movement of the loading arm in the downward direction is interrupted, with the cam follower 133 simply riding over the base circle of the cam 91. When the obstruction is removed, normal operation continues.

Another feature of the invention is embodied in the manner in which the individual blades 16 are forcibly fixed in their openings within the drum 17. As is best seen in FIG. 11, the initial insertion of the blade 16 serves to seat the blade loosely in the various notches provided for the projections 18, 20, 21. One projection in particular serves as a pivot, in this case projection 18. When the kicker head 128 engages the end of the blade 16 opposite the pivot projection 18, the effect is to rotate the blade 16 with an angular motion about its generally semi-circular engagement profile. The lower projection 21 rides over a protruding edge 138 in the opposite side of the track and the blade snaps firmly into position.

Figure 10:
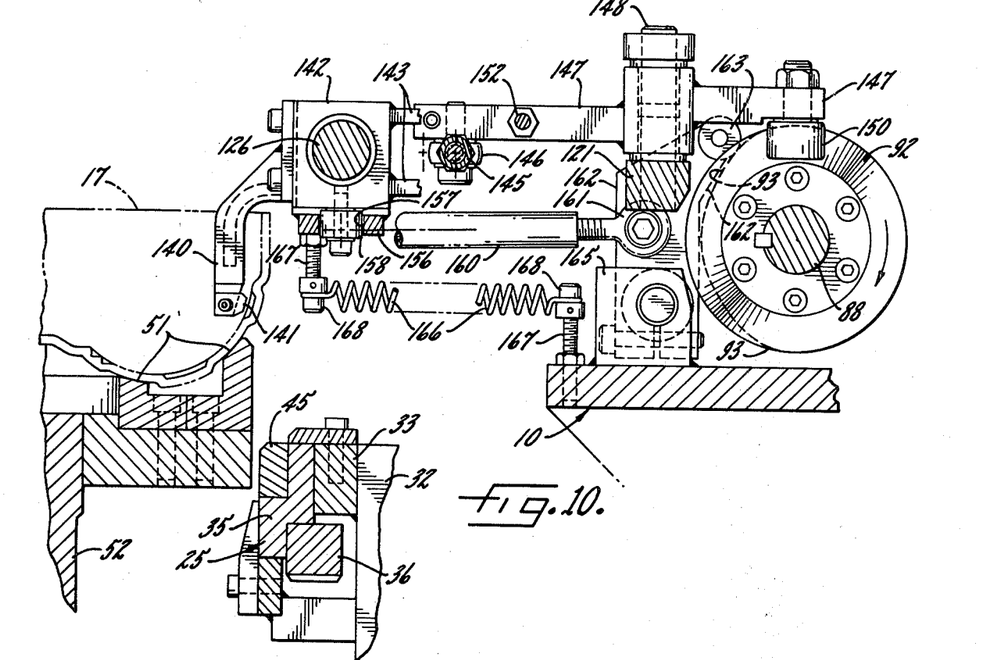
FIG. 10 is a section taken substantially along the line 10—10 of FIG. 9.

Successive blade positions in the drum 17 are indexed automatically by the machine through an indexing arm 140 as shown in FIGS. 9 and 10. At one end of the arm 140 is a tapered index key 141 which is shaped to fit within each successive blade opening in the track. The arm 140 is supported on a slide carriage 142. As best shown in FIG. 9, the C-shaped slide carriage 142 comprises two end sections, each having a bore, connected by a bridge piece 143. The slide carriage 142 straddles the loading arm mechanism and is longitudinally slidable on the slide bar 126. As provided by the invention, the index arm 140 and key 141 have separately controlled sliding and nodding motions by which accurate indexing of the drum 17 is accomplished.

Taking the sliding motion first, the slide carriage 142 is connected to an index search lever 147 by an adjustable link 145 having ball joints 146 at each end. The index search lever 147 is pivoted to an upright pivot post 148 and carries at its opposite end a roller cam follower 150. It will be noted that the roller cam follower 150 is also on a vertical axis along with the upright pivot shaft 148, and that the index search cam 92 has as its operative surface a side face of the cam rather than the peripheral face as with the other cams 90, 91, 93.

As a feature of the invention, a yieldable resilient linkage for urging the index slide carriage 142 in the forward indexing direction is achieved through the use of a tension spring 151 connected between the index search lever 147 and the fixed support bracket 127 by eyebolts 152. The tension spring 151 tends to urge the roller cam follower 150 against the side face of the index search cam 92 so that should the index arm 140 meet an obstruction in the forward index translation direction the movement of the mechanism is interrupted without the possibility of damaging the mechanism. The forward translation force applied to the drum 17 is solely provided by the spring 151, and can be adjusted by merely screwing one or both of the eyebolts 152 in or out.

Fine adjustments of the final drum index position are obtained through a knurled adjustment screw 153. Because the sole force tending to urge the index arm 140 in the forward translation direction is obtained from the spring 151, contact of an abutment 155 on the carriage 142 with the adjustment screw 153 positively terminates forward carriage travel, causing the cam follower 150 to ride over the lowermost point of the index search cam 92 without touching. This has the advantage of allowing the index arm 140 movement to be easily varied while the machine is in operation.

Nodding motion, whereby the index key 141 is selectively inserted and withdrawn from the next succeeding blade opening in the track is accomplished with the index nod cam 93. As previously described, the slide carriage 142 is both slidable and rotatable about the cylindrical slide bar 126. Control of the nodding motion is achieved by means of a rocker frame 156 having a longitudinal slot 157 (FIG. 9). A roller 158 is fixed to a pivot post in the slide carriage 142 and slidable in the slot 157 so that rocking or nodding movement of the rocker frame 156 imparts the same motion to the slide carriage 142, while still allowing the carriage to slide freely in a longitudinal direction. The rocker frame 156 is in turn connected by a link 160 to a nod lever 162 by ball joints 161. The nod lever 162 has a roller cam follower 163 at one end engageable with a nod cam 93, and is pivoted to a support bracket 165 which is carried by the frame 10 of the machine.

As a feature of the invention, a resiliently yieldable linkage for moving the index key 141 in the engagement direction relative to the blade openings is obtained from a spring 166 which is connected to the rocker frame 156 by a spring pillar 167. An adjustable nut 168 on the pillar 167 allows the lever arm of the spring 166 to be selectively varied to change the spring tension and thus the engagement force of the index key 141. At its opposite end, the spring 166 is anchored to a similar pillar 167 with adjustable nut 168 secured to the frame 10. It may be seen that the spring 166 provides a yieldable means in the connecting linkage between the nod cam 93 and the index arm 140 so that upon encountering an obstruction, the engagement motion of the index arm 140 may be interrupted with the nod cam roller follower 163 lifting momentarily from the nod cam 93.

Figure 15:
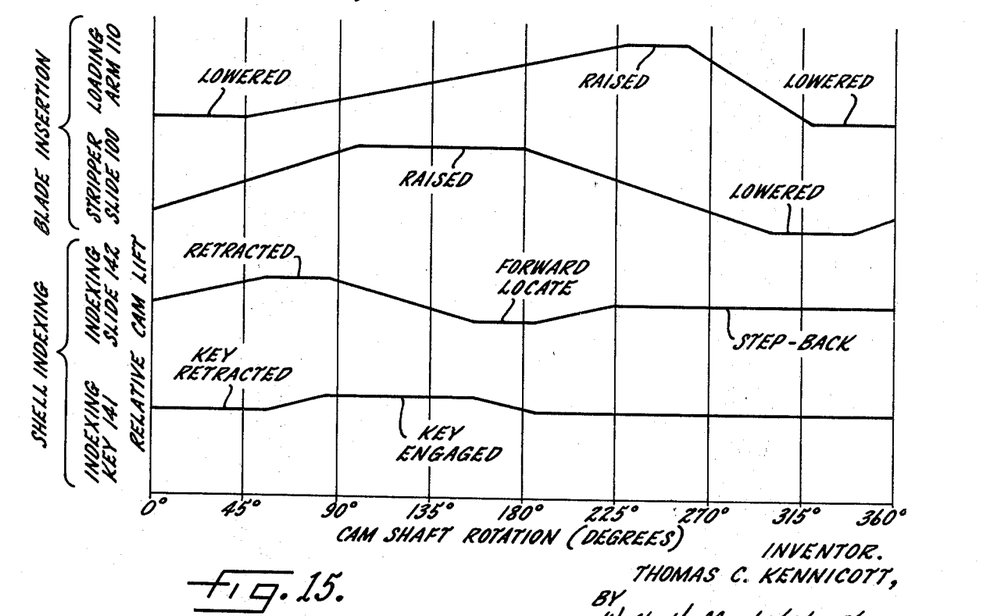
FIG. 15 is a graphical representation of the cam lift and mechanism operational cycles of the assembly machine as a function of cam rotation.

The chart of FIG. 15 illustrates the timing of the separate motions previously described in their operating relationship to one another. At the starting or home position of the cam assembly (0° on the chart), the single-revolution clutch 86 is held stationary by the solenoid 87. Upon actuation of the solenoid 87, one or more revolutions or cycle of 360° is performed by the cam assembly. At the start of cam motion, loading arm 110 is at its fully lowered location, the stripper 100 has just started its return travel in the upward direction, and the index key has retracted a short distance (referred to as step-back) from the preceding blade opening in the drum 17. The nod motion has withdrawn the index key 141 to a disengaged position.

In the initial steps of the assembly operation, the stripper 100 continues to rise to engage the next blade 16 while the loading arm 110 withdraws from its lowermost position to allow the next blade 16 to be loaded into position by the stripper 100. The index slide carriage 142 continues its rearward travel until it reaches a position wherein the index key 141 is engaged by the nod cam 93, whereupon it moves forward or hunts until the next blade opening is found. Upon engaging the next blade opening in the sequence, the slide carriage 142 translates in the forward direction to index the drum 17 within the next assembly 51, which serves as a rotatable support means for the receptacle drum 17. Engagement of the abutment 155 with the adjustable knurled stop screw 153 indicates the limit of forward carriage travel, whereupon the index key 141 disengages and the index slide carriage 142 steps back slightly to clear the area around the blade opening for the blade insertion step.

Blade insertion is accomplished as previously described, with the blade 16 being stripped from the feeding means which comprises the magazine 27 and related mechanism. The stripped blade is guided downward against the guide plate 97 and is pressed into engagement with its respective opening in the drum 17. While pressure is maintained on the blade 16 by the stripper slide 100, the loading arm 110 swings downward to engage one end of a blade 16 and forcibly rotate and snap it into position. The loading arm 110 continues to hold the blade 16 in position within the drum 17 as the stripper slide starts its return stroke. At this point, the cam assembly has completed 360° of rotation and the cycle repeats until the single-revolution clutch 86 is arrested by release of the solenoid 87.

The control means for the machine described in connection with the present invention is well known in the art and will not be described in detail. Operation of the machine is initiated by engagement of the drum 17 when placed in the loading pot 23 through actuation of the switch 50. This initiates translation of the transfer carriage 25, which operates between limits as determined by the limit switches 46, 47. Upon reaching the end of its travel, the transfer carriage 25 trips the limit switch 47 and starts the operating sequence of the elevator means 26. The elevator means, as previously described, moves between upper and lower limits as determined by limit switches 56, 57.

When the elevator means 26 is in the uppermost position as indictaed by actuation of the upper limit switch 57, the solenoid 87 is tripped to initiate the blade insertion operations. Each blade is inserted by a single revolution of the camshaft 88, and thus the solenoid 87 remains energized for a predetermined number of revolutions as determined by the number of blades to be assembled in each drum 17. Counting means (not shown) are provided for this purpose. While the assembly operation continues, the transfer carriage 25 is returned to the opposite end of its travel as indicated by the limit switch 46. When the counting means indicates that the last blade 16 has been assembled, the solenoid 87 is released and the elevator means 26 is lowered to its lower position as indicated by the lower limit switch 56. The transfer carriage 25 again shifts to transfer the completed drum assembly to the dump position. In this way the operation of the transfer carriage 25 is synchronized with the elevator means 26 for alternate deposit and removal of empty and assembled drums from the ready position. A dump limit switch 170 is used to indicate the limit of travel of the dump air cylinder 68.

The following is claimed as invention:

1. In a machine for assembling inserts into each of a plurality of spaced openings in a receptacle, the combination comprising:
a frame having an assembly position adapted to retain and locate said receptacle, and having feeding means for successively presenting individual inserts at an assembly station within said assembly position,
insert assembly means including a stripper adapted to successively pick up and carry an individual insert from said feeding means to said assembly position, and inserting means for fixing each insert into its corresponding opening in said receptacle,
indexing means for successively positioning individual receptacle openings at said assembly station, said indexing means including a slide bar mounted on said frame, a carriage rotatably and slidably carried by said slide bar, and an index key carried by said carriage, whereby said index key is movable in both longitudinal reciprocating translation and angular nodding motion and engageable with individual ones of said openings,
a rotatable camshaft having an index shift cam and an index dive cam carried by said frame,
first linkage means including a cam follower associated with said index shift cam for imparting longitudinal reciprocating translation to said carriage, said first linkage means having a yieldable connection in the forward index translation direction.

2. Apparatus as defined in claim 1 for the assembly of inserts into a toroidal receptacle half in which said frame includes rotatable support means at said assembly position for allowing rotational index movement of said receptacle.

3. Apparatus as defined in claim 1 in which said inserting means includes a kicker arm journaled to a kicker pivot shaft mounted on said frame, said kicker arm being positioned to engage a positioned insert at said assembly station and forceably fixed it into its corresponding opening, and said power means being additionally effective to actuate said kicker arm in synchronism with said insert assembly means.

4. Apparatus as defined in claim 3 in which a portion of said slide bar comprises said kicker pivot shaft.

5. Apparatus as defined in claim 3 in which said camshaft includes a kicker cam and third linkage means including a cam follower associated with said kicker cam for imparting forcible motion to said kicker arm, said third linkage means having a yieldable connection in the direction of kicker arm engagement with an insert.

6. Apparatus as defined in claim 3 in which said camshaft includes a stripper cam, and having fourth linkage means including a cam follower associated with said stripper cam for imparting motion to said stripper for picking up and carrying individual inserts to said assembly position.

7. Apparatus as defined in claim 6 for the assembly of inserts having a substantially semi-circular engagement profile into corresponding openings in said receptacle, said inserts each having at one end a projection engageable with a corresponding notch in said opening, and in which said kicker arm is positioned to engage an end of said insert opposite said projection whereby said insert is urged into its corresponding opening with an angular movement pivoting substantially about said notch.

8. Apparatus for the assembly of inserts into a toroidal receptacle half as defined in claim 1, including receptacle transfer means, said transfer means comprising
elevator means for transferring a receptacle between a ready position and said assembly position,
a transfer carriage having a load basket and an unload basket spaced side-by-side, said carriage being laterally reciprocable over a distance corresponding to the spacing of said baskets to shift said load basket between a loading position and said ready position, and said unload basket between said ready position and a dump position,
said elevator means including receptacle support means adapted to remove a receptacle from said load basket at said ready position, and after shifting said carriage to deposit a receptacle in said unload basket at said ready position,
elevator power means for shifting said elevator between said ready position and said assembly position, and carriage power means synchronized with said elevator power means for shifting said carriage, whereby empty and assembled receptacles are alternately deposited in and removed from said ready station.

9. Apparatus as defined in claim 8 including counting means for counting the number of inserts assembled into a receptacle at said assembly position, and control means for actuating said elevator means and receptacle transfer means to replace an assembled receptacle in said assembly position with an empty receptacle after a predetermined number of inserts have been assembled.

References Cited

UNITED STATES PATENTS

| | | |
|---|---|---|
| 3,118,218 | 1/1964 | Gleason et al. |
| 3,299,495 | 1/1967 | Wysocki. |
| 3,300,846 | 1/1967 | Jones ______________ 29—208 |

THOMAS H. EAGER, Primary Examiner

U.S. Cl. X.R.

29—211